United States Patent [19]
Ambrosio et al.

[11] Patent Number: 5,944,024
[45] Date of Patent: Aug. 31, 1999

[54] VACUUM FILTRATION SYSTEM ESPECIALLY ADAPTED FOR REMOVING SMOKE IN THE VICINITY OF ASHTRAYS

[75] Inventors: Neil Ambrosio, Sunrise, Fla.; William Forsythe, Fountain Valley, Calif.; Bruce Hatton, Ramona, Calif.; Robert Keaton, Westminster, Calif.; Larry Kinder, Las Vegas, Nev.

[73] Assignee: Progressive Games, Inc., Las Vegas, Nev.

[21] Appl. No.: 08/612,570

[22] Filed: Mar. 8, 1996

[51] Int. Cl.$^6$ .................................................. A24F 19/00
[52] U.S. Cl. ........................... 131/231; 131/232; 131/242
[58] Field of Search ................................. 131/231, 232, 131/236, 237, 242; 55/256, 279, 385

[56] References Cited

U.S. PATENT DOCUMENTS

| | | | |
|---|---|---|---|
| 991,263 | 5/1911 | Bajluk | 131/231 |
| 1,030,116 | 6/1912 | Noga | 131/231 |
| 1,105,362 | 7/1914 | Mayer | 131/231 |
| 1,615,729 | 1/1927 | Thompson | 131/231 |
| 1,992,450 | 2/1935 | Sporman | 206/19.5 |
| 2,299,668 | 10/1942 | Webster | 206/19.5 |
| 2,461,815 | 2/1949 | Gill | 206/19.5 |
| 2,559,178 | 7/1951 | Thompson | 206/19.5 |
| 2,616,557 | 11/1952 | Gill et al. | 206/19.5 |
| 2,675,122 | 4/1954 | Minnie | 206/19.5 |
| 2,716,464 | 8/1955 | Weisbecker | 183/36 |
| 2,754,145 | 7/1956 | Mackey | 296/1 |
| 2,764,281 | 9/1956 | Mendenhall | 206/19.5 |
| 2,829,766 | 4/1958 | Gill | 206/19.5 |
| 2,874,702 | 2/1959 | Walker et al. | 131/235 |
| 2,962,181 | 11/1960 | Nelson | 220/1 |
| 3,011,627 | 12/1961 | Frost | 206/19.5 |
| 3,113,665 | 12/1963 | Frost | 206/19.5 |
| 3,648,837 | 3/1972 | Ogle | 206/19.5 |
| 3,663,432 | 5/1972 | Ellison | 206/19.5 |
| 3,683,938 | 8/1972 | Rowland | 131/240 R |
| 3,797,205 | 3/1974 | Weisskopf | 55/385 |
| 4,043,776 | 8/1977 | Orel | 131/238 |
| 4,061,149 | 12/1977 | Raczkowski | 131/231 |
| 4,119,419 | 10/1978 | Passaro et al. | 55/212 |
| 4,154,251 | 5/1979 | Doyel | 131/231 |
| 4,161,181 | 7/1979 | Nicks et al. | 131/231 |
| 4,550,738 | 11/1985 | Estey | 131/236 |
| 4,597,784 | 7/1986 | Albrecht et al. | 55/378 |
| 4,623,367 | 11/1986 | Paulson | 55/385 R |
| 4,643,204 | 2/1987 | Ford | 131/231 |
| 4,671,300 | 6/1987 | Grube et al. | 131/231 |
| 4,883,224 | 11/1989 | Sun | 232/43.1 |
| 4,906,261 | 3/1990 | Mohajer | 55/256 |
| 5,167,576 | 12/1992 | Hoek | 454/230 |
| 5,230,720 | 7/1993 | Kendall | 55/210 |
| 5,259,400 | 11/1993 | Bruno et al. | 131/238 |
| 5,361,784 | 11/1994 | Kinder | 131/231 |
| 5,441,279 | 8/1995 | Messina | 273/309 |

FOREIGN PATENT DOCUMENTS

| | | | |
|---|---|---|---|
| 1074084 | 3/1954 | France . | |
| 2327330 | 5/1973 | Germany | A24F 19/10 |
| 2806623 | 2/1978 | Germany | A24F 19/00 |
| 362883 | 6/1930 | United Kingdom | A24F 19/10 |
| 9524134 | 9/1995 | WIPO | A24F 10/19 |

*Primary Examiner*—John G. Weiss
*Assistant Examiner*—Charles Anderson

[57] ABSTRACT

A vacuum filtration system especially adapted for removing smoke in the vicinity of ashtrays includes a vacuum manifold assembly for connecting a plurality of hoods adapted for placement over ashtrays to a common charcoal filter and vacuum blower/motor assembly. The vacuum manifold includes a plurality of flexible tubing segments secured to connectors. A plurality of replaceable disposable first stage filter elements in fluid communication with each of the hoods filter smoke prior to passage into the manifold, thus substantially reducing tar fouling of the system. In a first embodiment of the invention, the hood includes a circular disk shaped member which also functions as a drink coaster disposed in fluid communication with a conduit slidably received in a connector mounted in the table adjacent an ashtray location. The combined hood and coaster may be raised and disposed over an ashtray to collect smoke, or lowered against the table surface for use as a drink coaster. In a second embodiment of the invention, the hood includes a partially cylindrical rear shroud to enhance smoke containment and collection. A control box includes an on/off switch and a power on LED.

19 Claims, 15 Drawing Sheets

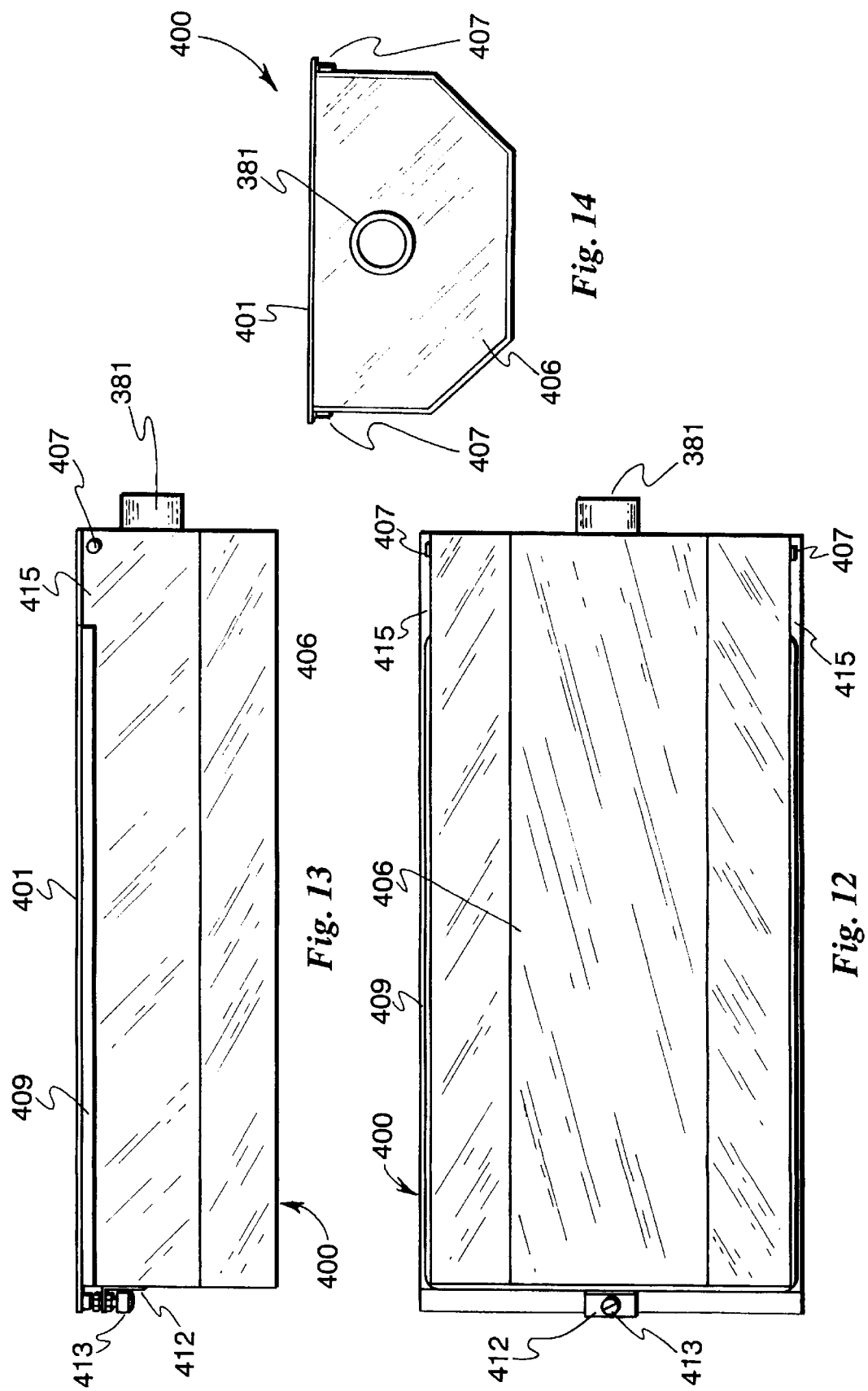

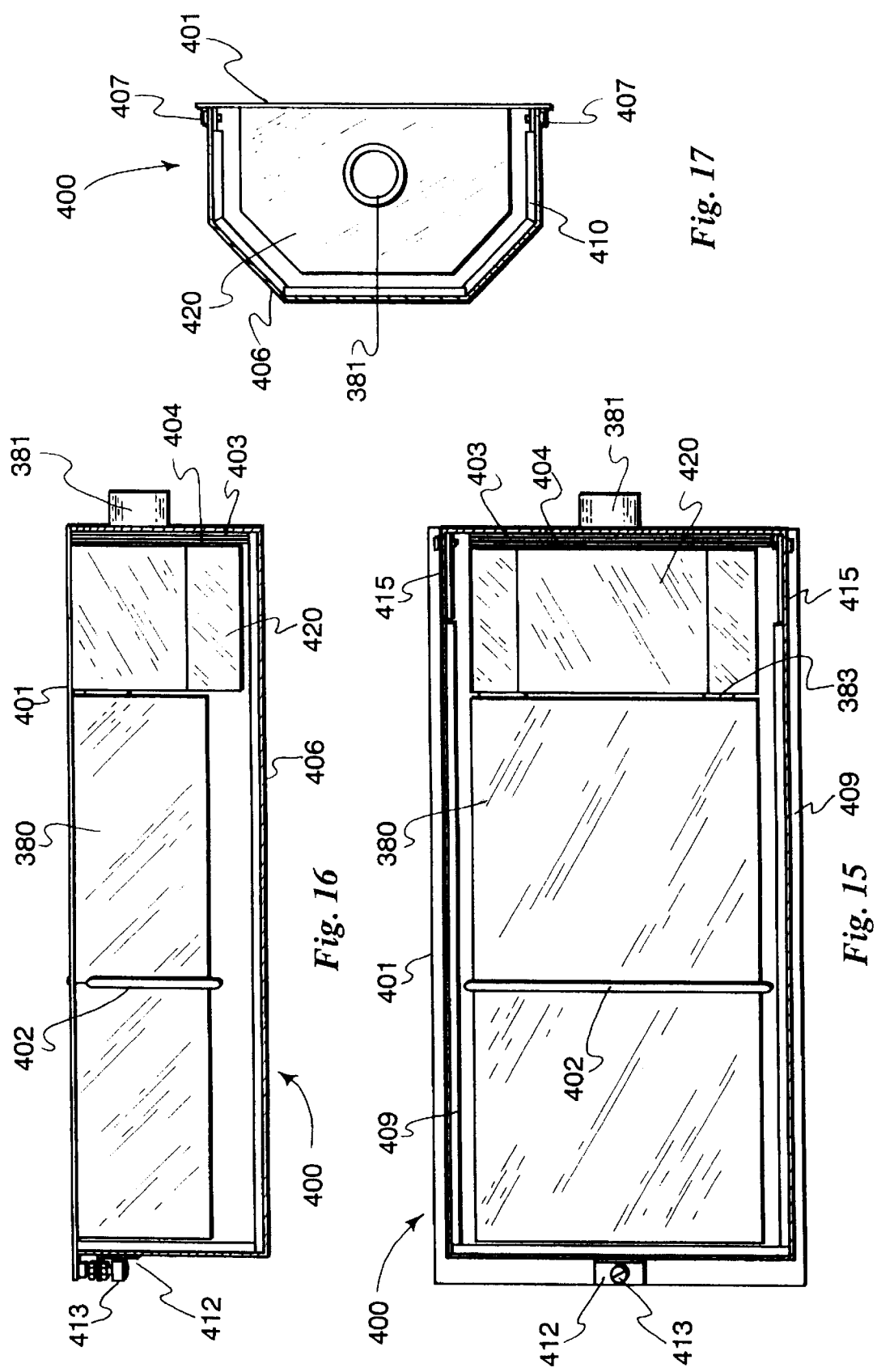

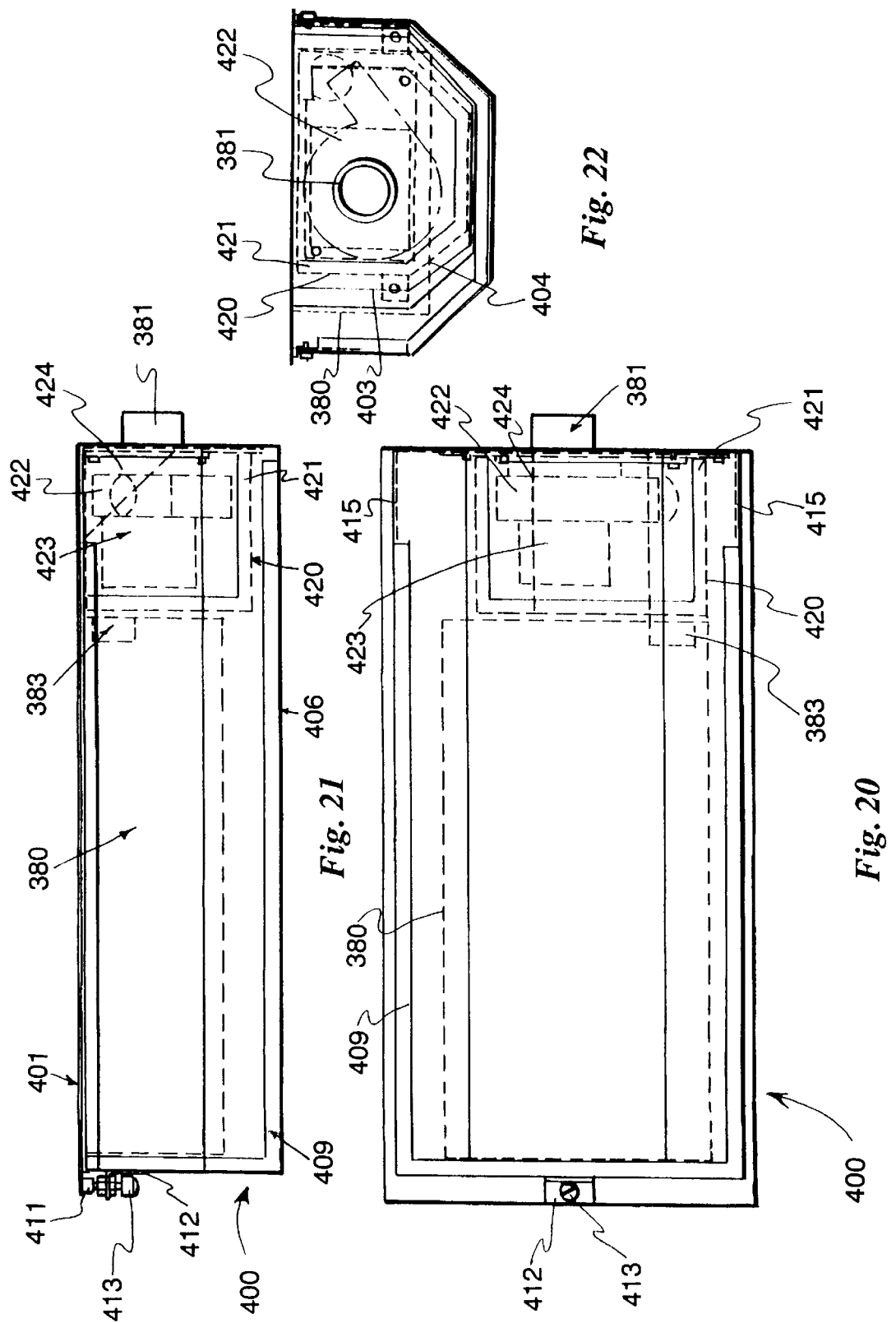

5,944,024

VACUUM FILTRATION SYSTEM ESPECIALLY ADAPTED FOR REMOVING SMOKE IN THE VICINITY OF ASHTRAYS

CROSS-REFERENCE TO RELATED APPLICATIONS

This application is generally related to U.S. patent application Ser. No. 08/379,361, filed Jan. 27, 1995 for "SYSTEM FOR REMOVING SMOKE FROM ASHTRAYS"; which is a continuation-in-part of U.S. patent application Ser. No. 08/230,645, filed Apr. 21, 1994 for "SMOKELESS ASHTRAY SYSTEM"; which is a continuation-in-part of U.S. patent application Ser. No. 08/208,467, filed Mar. 9, 1994 for "SYSTEM FOR EXHAUSTING SMOKE PRODUCED BY SMOKING ARTICLES SUCH AS CIGARETTES AND CIGARS"; which is a continuation-in-part of U.S. patent application Ser. No. 08/037,895 filed Mar. 26, 1993 for "SYSTEM FOR REMOVING AND DISPOSING OF CIGARETTE AND CIGAR SMOKE AND RESIDUES". The instant application is also generally related to U.S. patent application Ser. No. 08/512,173, filed Aug. 7, 1995 for "SYSTEM FOR EXHAUSTING SMOKE PRODUCED BY SMOKING ARTICLES SUCH AS CIGARETTES AND CIGARS"; which is a continuation of the above-listed U.S. patent application Ser. No. 08/208,467. The entire disclosures of each of the above listed prior copending applications are incorporated herein by reference.

BACKGROUND OF THE INVENTION

1. Field of the Invention

The present invention relates to ashtrays, and more particularly pertains to an improved vacuum filtration system for removing smoke in the vicinity of ashtrays from indoor room environments frequented by cigar and cigarette smokers such as restaurants, casinos, lounges, and bars.

2. Description of the Prior Art

A variety of vacuum and filtration systems have been proposed by the prior art in attempts to address the problems and potential health affects associated with smoking and resulting residues. Such systems have suffered from several disadvantages including difficult, tedious, and frequent maintenance, high initial cost and high maintenance costs, difficulty in installation, and incompatibility with existing structures. In casino applications, the prior art includes the provision of simple stainless steel cup-shaped ashtrays removeably inserted into holes provided in card gaming tables, in conjunction with screen assemblies removeably disposed in the ashtrays. The provision of simple glass ashtrays placed on casino gaming tables for use by smoking players is also a common practice in the prior art.

Many individuals find smoke-filled environments distasteful, and many governmental authorities have already taken steps to ban or order the creation of non-smoking sections in public and private establishments.

SUMMARY OF THE INVENTION

A vacuum filtration system especially adapted for removing smoke in the vicinity of ashtrays includes a vacuum manifold assembly for connecting a plurality of hoods adapted for placement over ashtrays to a common charcoal filter and vacuum blower/motor assembly. The vacuum manifold includes a plurality of flexible tubing segments secured to connectors. A plurality of replaceable disposable first stage filter elements in fluid communication with each of the hoods filter smoke prior to passage into the manifold, thus substantially reducing tar fouling of the system. In a first embodiment of the invention, the hood includes a circular disk shaped member which also functions as a drink coaster disposed in fluid communication with a conduit slidably received in a connector mounted in the table adjacent an ashtray location. The combined hood and coaster may be raised and disposed over an ashtray to collect smoke, or lowered against the table surface for use as a drink coaster. In a second embodiment of the invention, the hood includes a partially cylindrical rear shroud to enhance smoke containment and collection. A control box includes an on/off switch and a power on LED.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 12 is a top plan view illustrating the housing for second stage filter and motor components of the system of the present invention.

FIG. 13 is a side elevational view illustrating the housing for second stage filter and motor components of the system of the present invention.

FIG. 14 is a front elevational view illustrating the housing for second stage filter and motor components of the system of the present invention.

FIG. 15 is a partially cut away top plan view illustrating the housing containing second stage filter and motor components of the system of the present invention.

FIG. 16 is a partially cut away side elevational view illustrating the housing containing second stage filter and motor components of the system of the present invention.

FIG. 17 is a partially cut away front elevational view illustrating the housing containing second stage filter and motor components of the system of the present invention.

FIG. 20 is a diagrammatic top plan view illustrating the housing containing second stage filter and motor components of the system of the present invention.

FIG. 21 is a diagrammatic side elevational view illustrating the housing containing second stage filter and motor components of the system of the present invention.

FIG. 22 is a diagrammatic front elevational view illustrating the housing containing second stage filter and motor components of the system of the present invention.

DETAILED DESCRIPTION OF THE PREFERRED EMBODIMENT(S)

Figure 1:
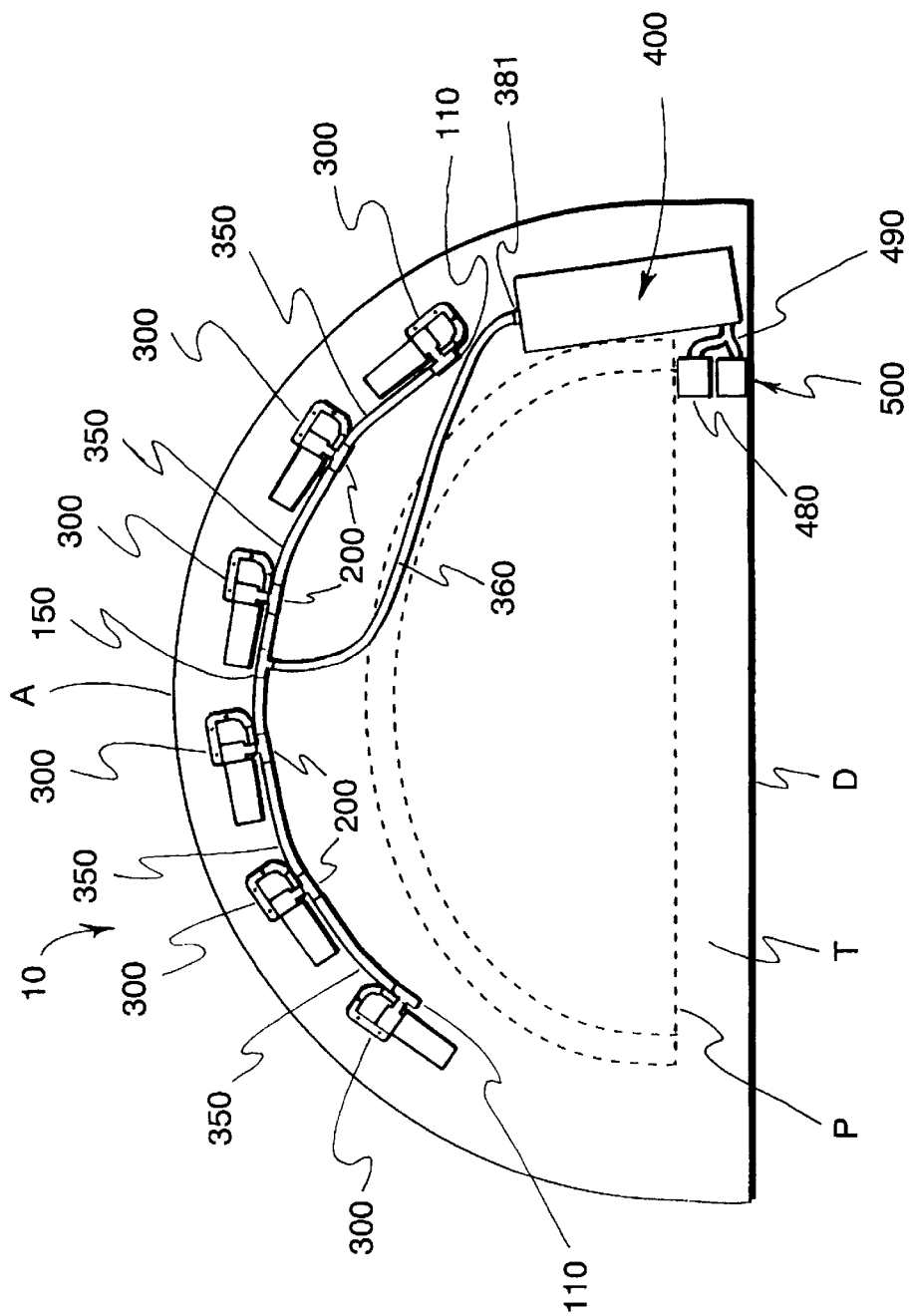
FIG. 1 is a bottom plan view illustrating the vacuum manifold conduit of the vacuum filtration system especially adapted for removing smoke in the vicinity of ashtrays of the present invention, as installed on a conventional live casino card gaming table.

Referring now to the drawings, wherein like reference numerals designate corresponding structure throughout the views, and referring in particular to FIG. 1, an improved vacuum filtration system 10 especially adapted for removing smoke in the vicinity of ashtrays according to a first preferred embodiment of the invention may be provided in the form of a kit adapted for convenient retrofit installation in a variety of existing structures including bars, tables, counters, casino slot machine bases, and, in the form illustrated in FIG. 1, in live casino card gaming tables of the type utilized in the play of Caribbean Stud (TM) poker, Blackjack or Twenty-One. The system 10 illustrated in FIG. 1 is an example installation in a seven-player casino gaming table and includes a plurality of first stage filter elements 300 corresponding to each of six conventional ashtrays installed between or placed upon the surface of the table between the seven player locations. In this context, some of the prior art casino gaming tables include holes which receive stainless steel cup shaped ashtrays. Other prior art casino gaming tables are provided with simple glass ashtrays which are placed on the surface of the table adjacent a smoking player. The system of the present invention is suitable for use with either type of conventional ashtray arrangement. Flexible tubing segments 350, end connectors 110, T connectors 200, exhaust line T connector 150, and exhaust line 360 form a vacuum manifold connecting each of the six first stage filters 300 to a vacuum motor/pump and charcoal filter contained within a housing 400. A control housing 500 and a power supply housing 480 connected by a wiring harness 490 to the motor within the housing 400 provides power and control functions to enable a human operator, such as a card dealer, to turn the system on or off as needed.

Figure 2:
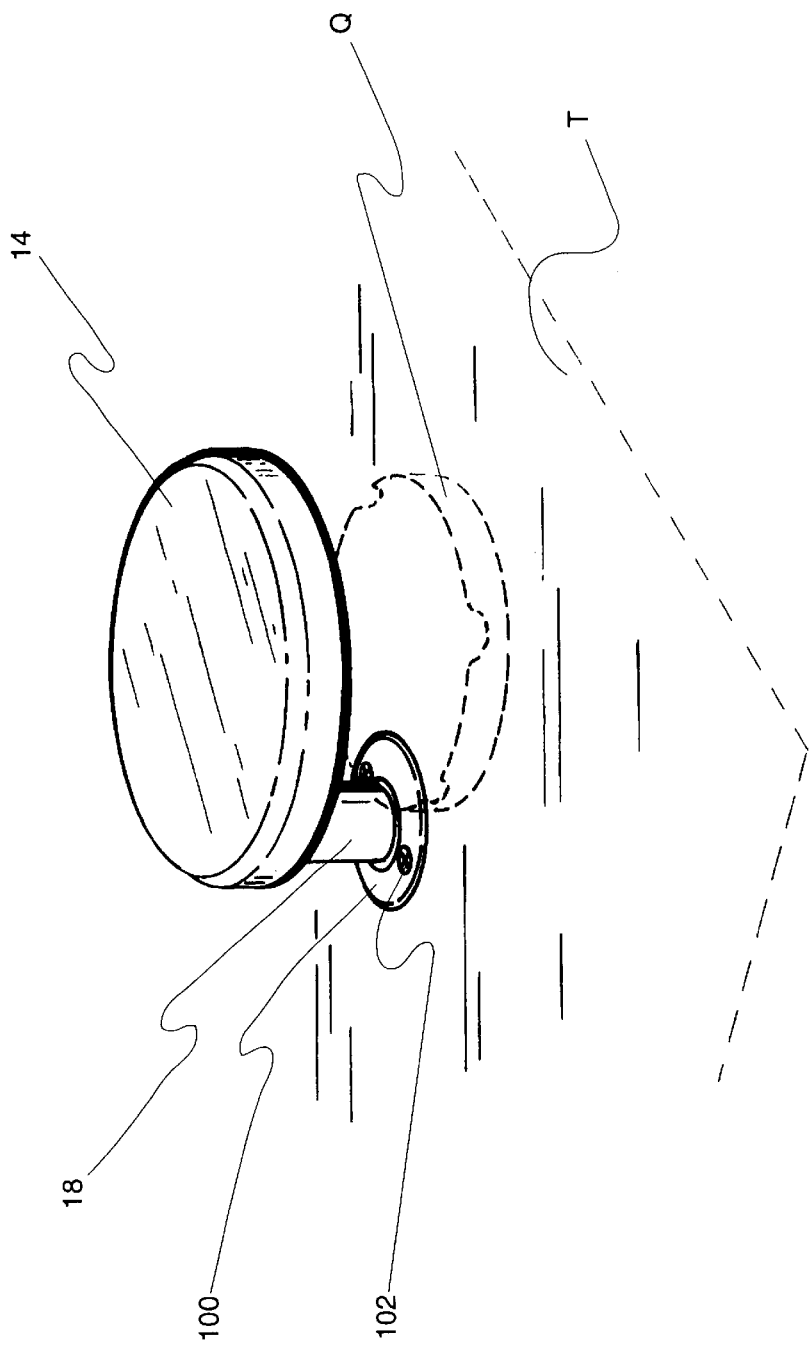
FIG. 2 is a top perspective view illustrating a combined drink coaster and smoke collection hood according to a first embodiment of the system of the present invention disposed over an ashtray on the surface of a conventional live casino card gaming table.
Figure 3:
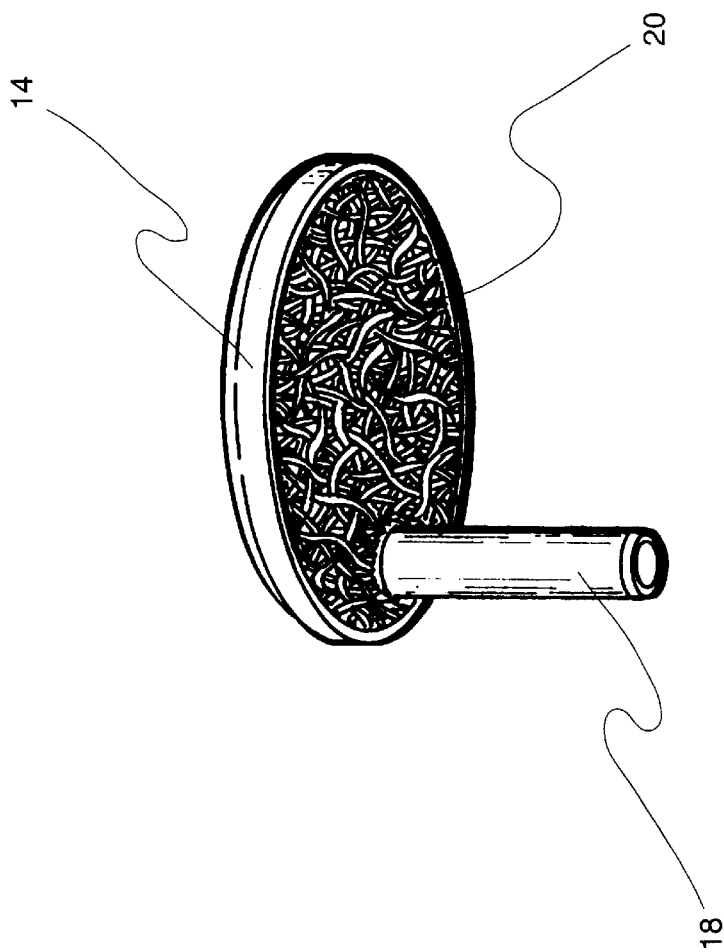
FIG. 3 is a bottom perspective view illustrating the combined drink coaster and smoke collection hood of FIG. 2.

FIGS. 2 and 3 illustrate a combined hood and drink coaster 14 according to a first embodiment of the invention. The hood 14 is adapted to overlie a conventional ashtray Q disposed on the surface of a table T for the purpose of suctioning smoke from the vicinity of the ashtray away through a tubular flue member 18. An expanded metal filter or screen 20 prevents ashes and other debris from being sucked into the hood 14 where it might become a fire hazard due to the increased level of draft in the manifold system. The flue member 18 attached in fluid communication with the hood 14 is received for sliding movement through a trim ring 100 for the purpose of permitting vertical adjustment of the position of the hood 14. The hood 14 may be pushed flush against the surface of the table T and used as a drink coaster.

Figure 4:
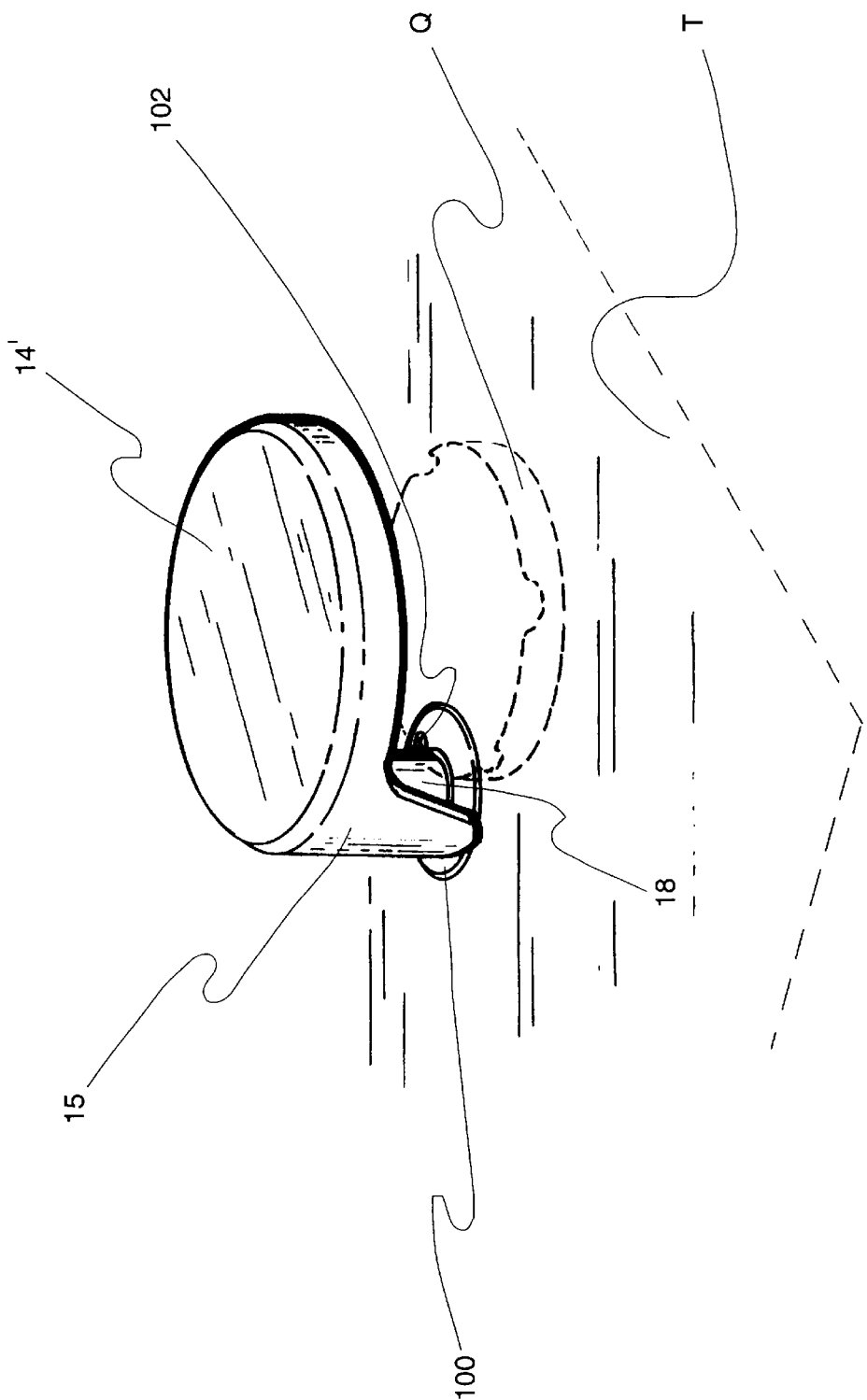
FIG. 4 is a top perspective view illustrating a smoke collection hood according to a second embodiment of the system of the present invention disposed over an ashtray on the surface of a conventional live casino card gaming table.
Figure 5:
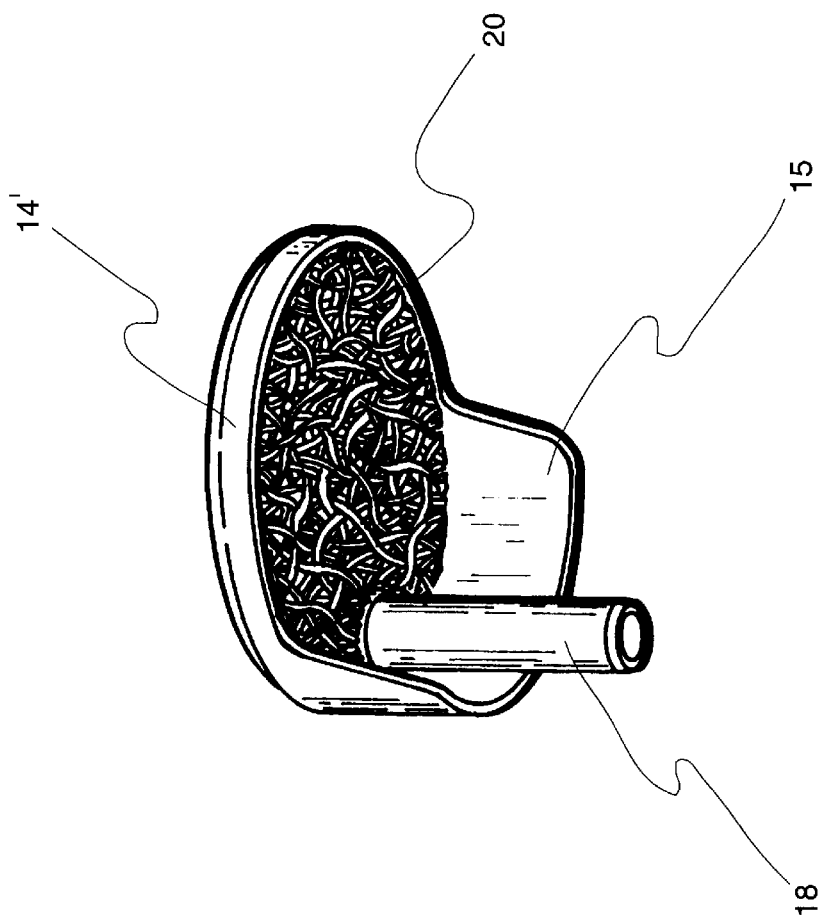
FIG. 5 is a bottom perspective view illustrating the smoke collection hood of FIG. 4.

FIGS. 4 and 5 illustrate a hood 14' according to a second embodiment of the invention which includes a partially cylindrical shroud 15 adapted to contain and facilitate the removal of smoke. The shroud 15 limits the vertical adjustability of the hood 14'.

With reference to FIGS. 1 and 6–9, the manner of installing the system 10 in a conventional casino card gaming table T will now be described. The table T illustrated is of the type having seven player locations spaced around one arcuate side A and a chip rack disposed adjacent an opposite straight edge D where a dealer typically stands. A central pedestal P supports the table surface at a desired elevation, in a conventional manner. An installation technician first chucks a suitable drill or bit in a power drill, in a conventional manner, and removes the table top from the supporting base or pedestal P. Using a locating template or other technique for measuring and marking preferably uniformly spaced points disposed on a common arc adjacent the arcuate edge A of the table T, the installation technician drills or cuts six holes 13 through the table surface dimensioned for insertion of a plurality of bushings 253. The table T typically comprises a rigid sheet material such as plywood covered by a felt layout sheet F suitably marked for the associated card game. The technician then inserts one of the bushings 253 into each of the holes 13, and secures each bushing in position using screws 255 inserted through bushing flange apertures 256. Each of the bushings 253 contain seal members 104, 105, and 106. The technician then installs a trim ring 100 over each bushing 253 by the use of screws 102 inserted through holes 103 in each of the trim rings 100. The technician then assembles the filter elements 300 and the vacuum conduit manifold on the underside of the table T, as shown in FIG. 1. The two vacuum conduit end connectors 110 couple the first stage filter elements 300 at the outermost ashtray locations to adjacent conduit segments 350. The T connectors 200 couple the four intermediate ashtray locations to adjacent ashtray locations via additional conduit segments 350. The single exhaust line connector 150 couples the multiple ashtray manifold to the filter/motor coupling conduit 360. Brackets or straps may optionally be employed to secure the manifold segments 350 and the exhaust line 360 to the underside of the table T. As may be readily appreciated, the system 10 thus couples a plurality of smoke collection hoods 14 disposed adjacent a plurality of ashtrays by use of a flexible conduit manifold system. Preferably, each of the conduit segments 350 and 360 comprise a vapor tight conduit, which may be plastic or metal. Plastic electrical conduit is currently preferred, and may be connected by press fit engagement with the connectors, with or without the use of glue. Another suitable, although less preferred, conduit material is 1.25 in. I.D. flexible exhaust tubing available from Perfection Automotive of Livonia, Mich. In a less preferred alternative embodiment, in order to provide air tight connections between the connectors 110, 150, 200 and the conduit segments 350 and 360, short lengths of heat shrink tubing may be used at the locations where the conduit segments 350 join the connectors 110, 150, and 200. A similar connection may be used to connect the exhaust conduit 360. One example flame retardant heat shrink tubing material is Low Shrink Temperature (90 degrees C) Polyolefin FIT 221LT available from Alpha Wire Corporation of Elizabeth, N.J.

Figure 10:
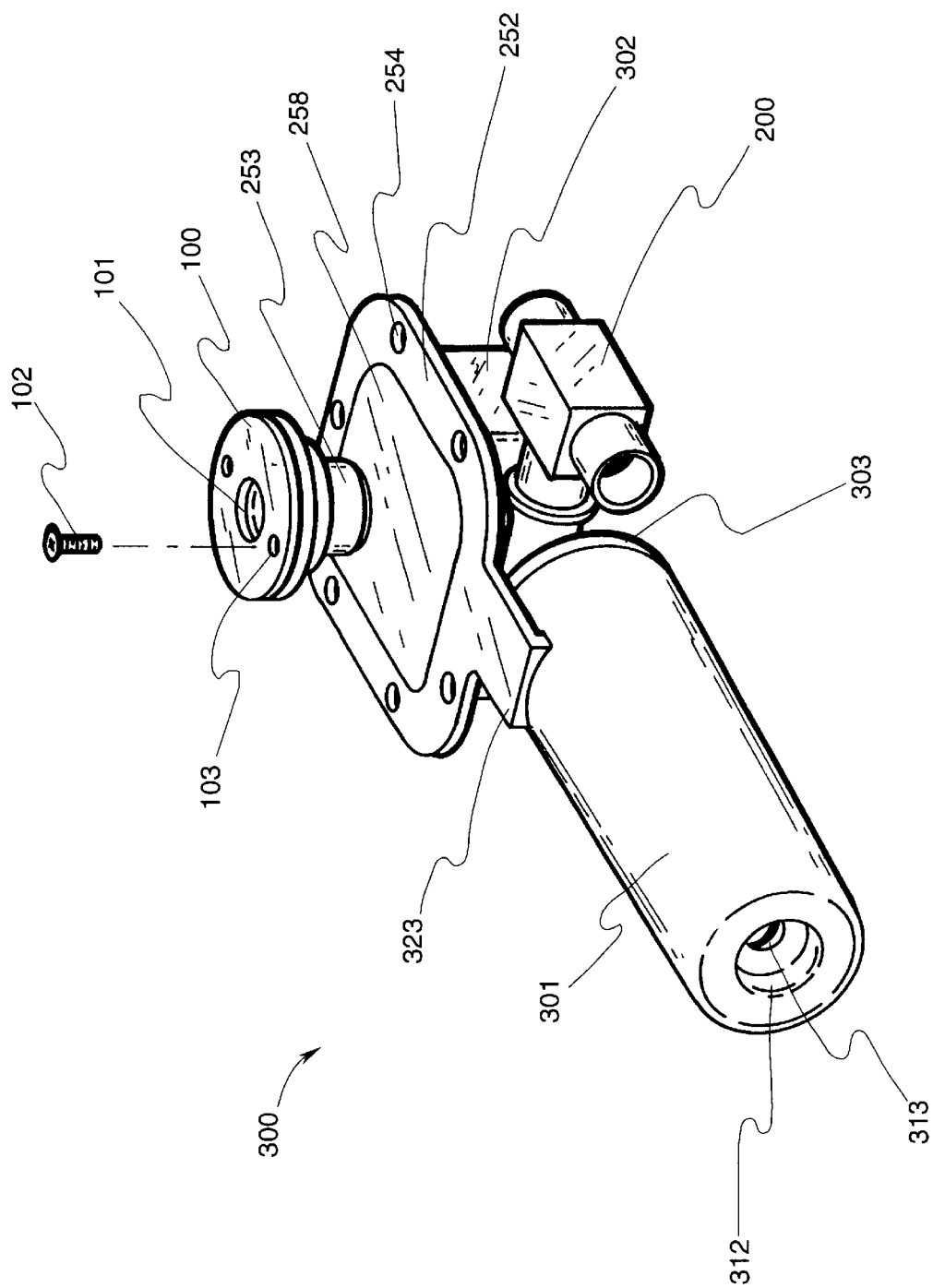
FIG. 10 is a partially exploded perspective view illustrating the first stage filter and hood conduit connector components of the system of the present invention.
Figure 11:
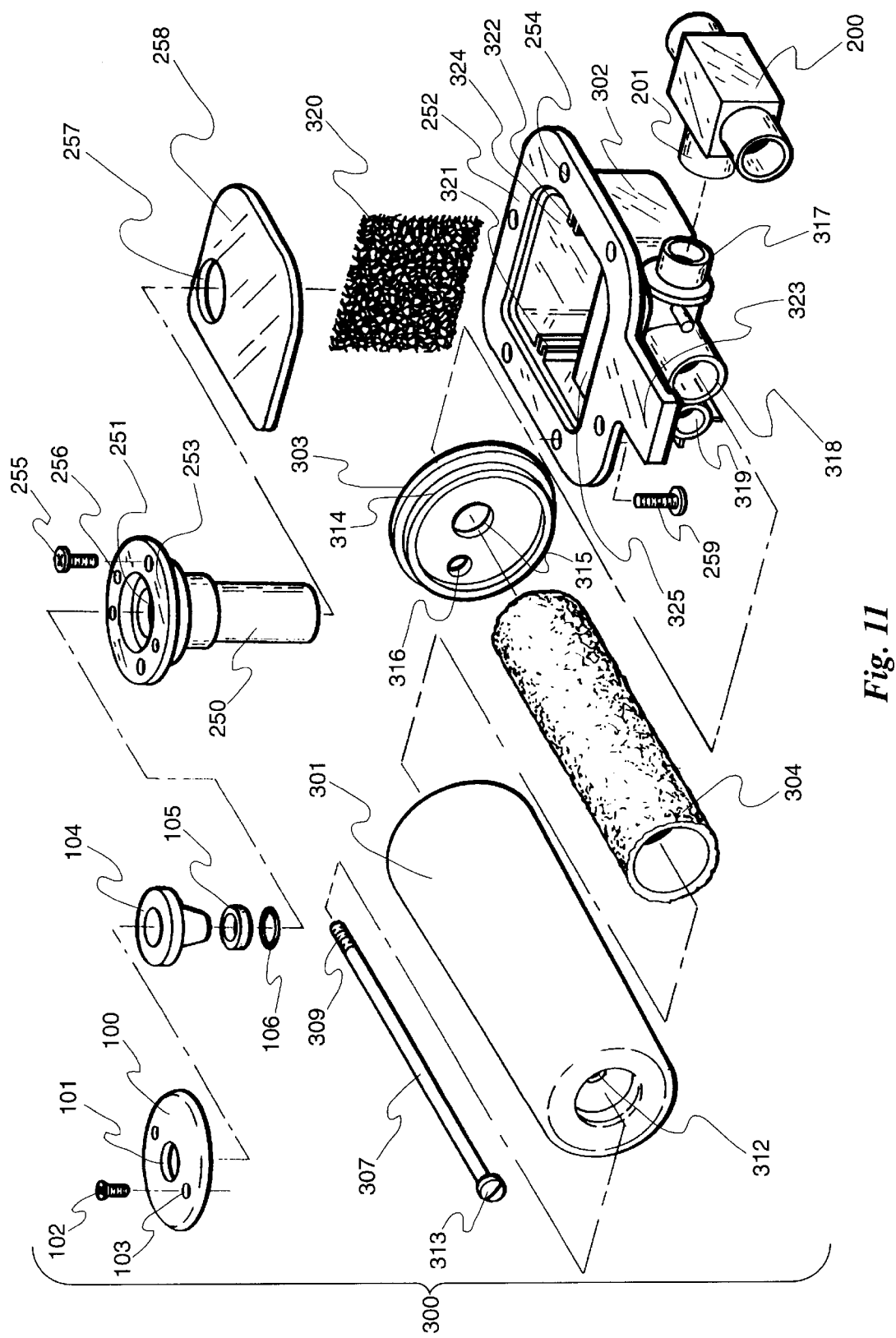
FIG. 11 is a fully exploded perspective view illustrating first stage filter and hood conduit connector components of the system of the present invention.
Figure 19:
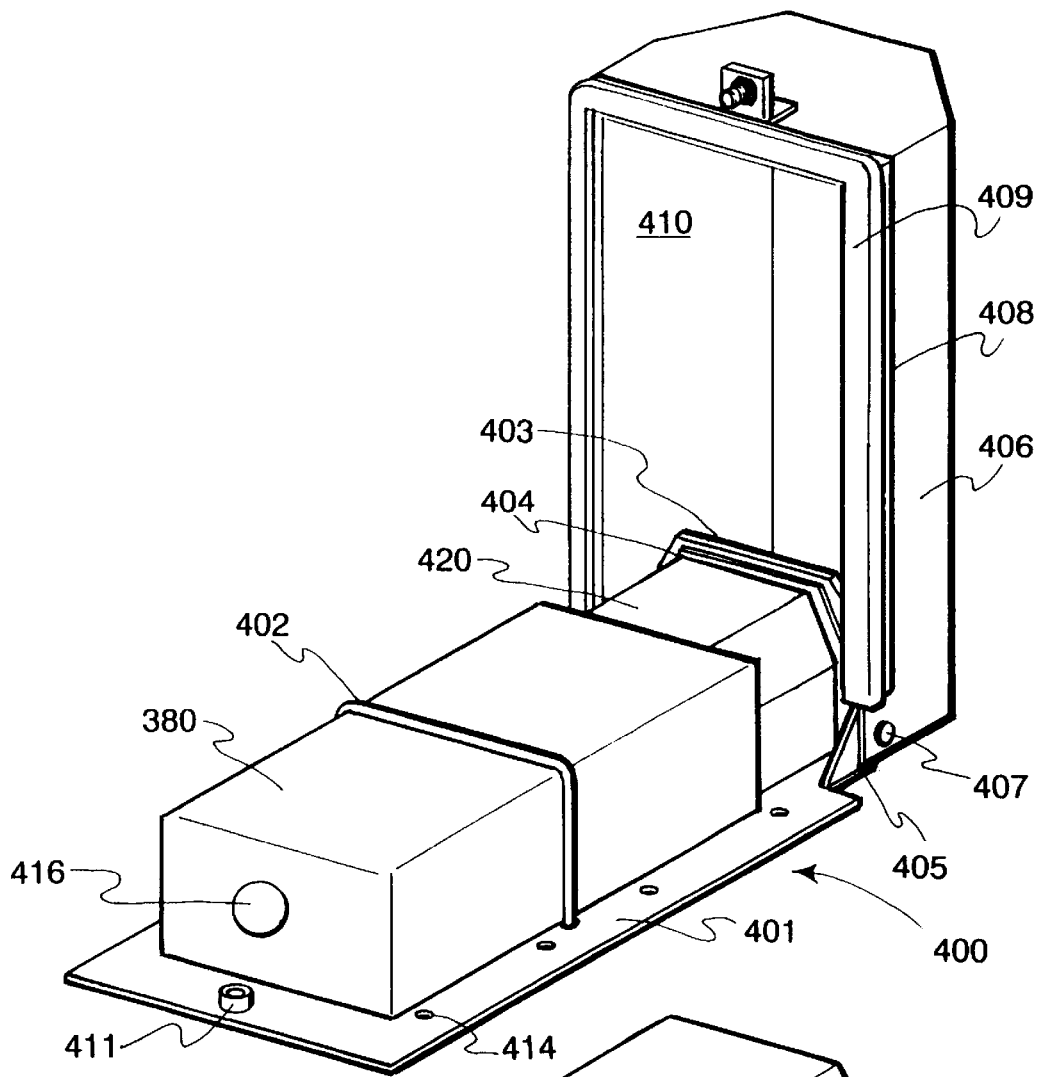
FIG. 19 is a top front perspective view illustrating the housing containing the second stage filter and motor components of the system of the present invention, with the housing cover open.
Figure 18:
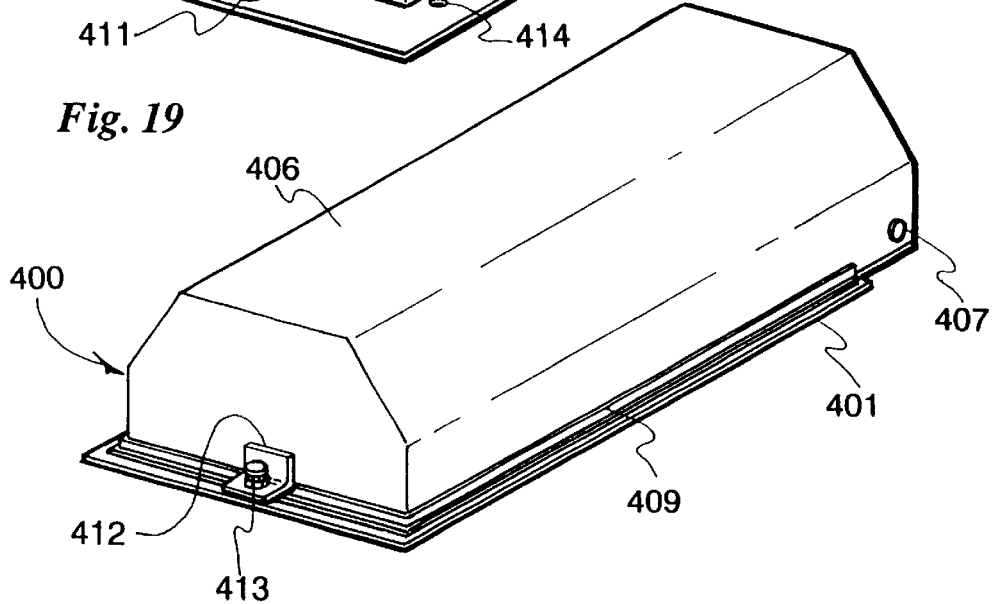
FIG. 18 is a top front perspective view illustrating the housing for the second stage filter and motor components of the system of the present invention, with the housing cover closed.

With reference to FIGS. 1 and 6–9, substantially identical filter elements 300 are installed at each of the six ashtray locations. The technician secures the filter element 300 in a desired position on the underside of the table T using a plurality of screws 259 which extend through a plurality of preformed holes 254 (FIG. 10) in a mounting flange portion 252 of the filter element 300.

After the vacuum manifold and filter elements 300 have been assembled and attached to the underside of the table T, the housing 400 containing a charcoal filter 380 and motor/pump assembly 420 is secured in a desired location. FIGS. 12–22 illustrate the housing 400, charcoal filter 380, and motor/pump assembly 420, which will be described in detail hereinafter. The selected mounting location for the housing 400 might be to the underside of the table or within a hollow table supporting base or pedestal P. In any event, suitable fasteners such as screws or bolts secure the filter/motor housing 400 in a fixed location. The outlet end of the conduit 360 is then secured to the motor/pump inlet 381 by the use of a conventional fastening technique, such as heat shrink tubing, which may be shrunk to fit using a conventional electrical heat gun. The technician then also fastens a power supply 480 and a control box 500 in desired locations, preferably where they will be readily accessible by a dealer disposed adjacent edge D of the table T, but not accessible to players. The technician then connects the motor/pump assembly 420, power supply 480, and control box 500 using a quick connect wiring harness 490.

After reassembly of the table top T on the support base or pedestal P, the technician inserts flue members 18 of collection hoods 14 through the central apertures 101 of the trim rings 100, and then through the bushings 253 extending through the table T at each player location, such that the seal members 104, 105 and 106 form a substantially air tight seal around each of the flue members 18. The length of outlet conduit portions 250 of the bushings 253 suffices to compensate for tables T having various different thicknesses. The entire process can be accomplished in about 1.5 hrs. without the need for highly skilled workers.

The system 10 may be installed in a variety of other structures, such as bar rails, counter tops, desks, in vehicles such as planes, trains, and busses, and in other casino related structures such as the bases of slot machines.

Figure 6:
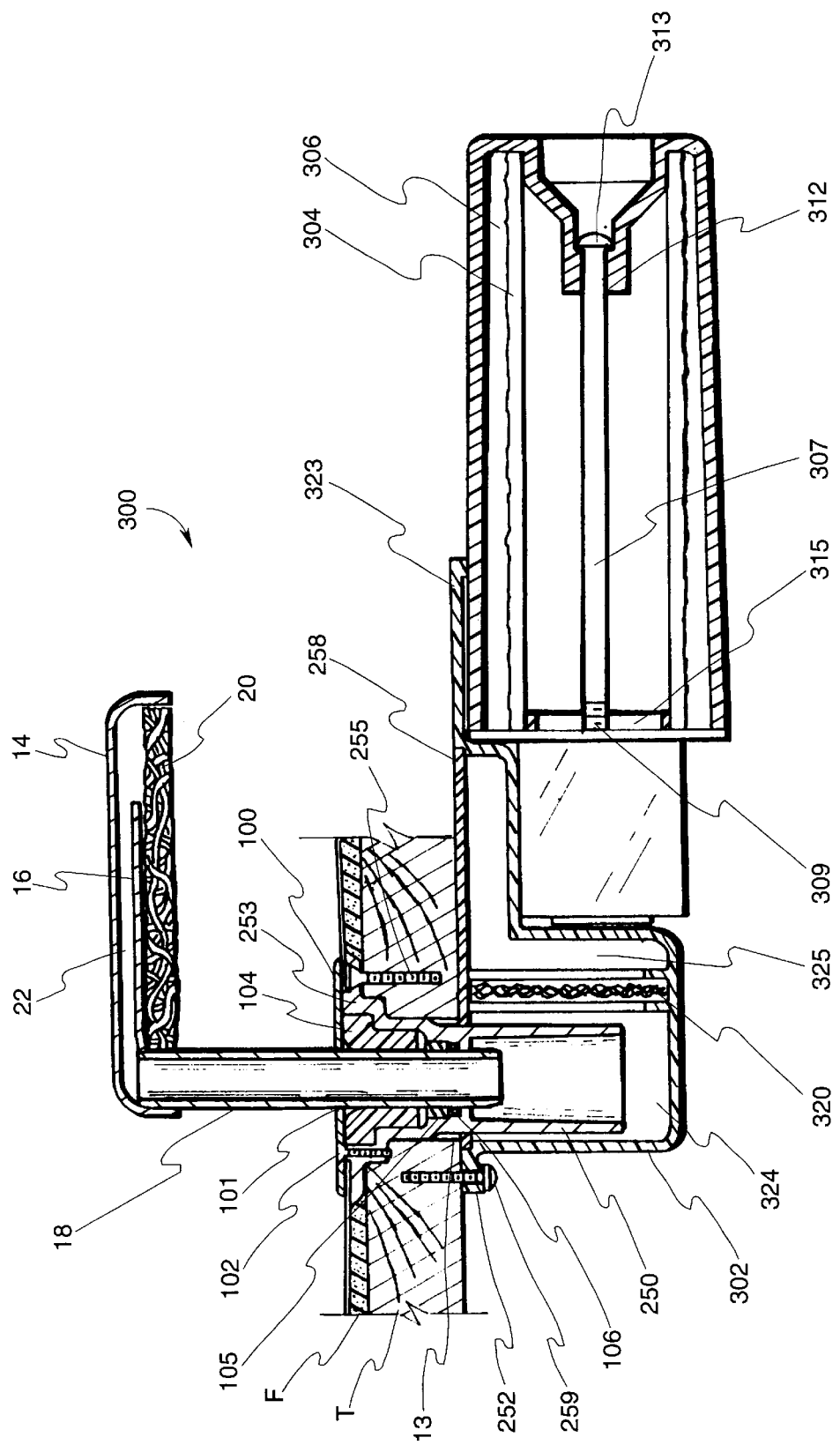
FIG. 6 is a partially cut away cross-sectional view illustrating the combined hood and coaster, first stage filter, and manifold components of the system of the present invention, as installed on a conventional casino gaming table.
Figure 7:
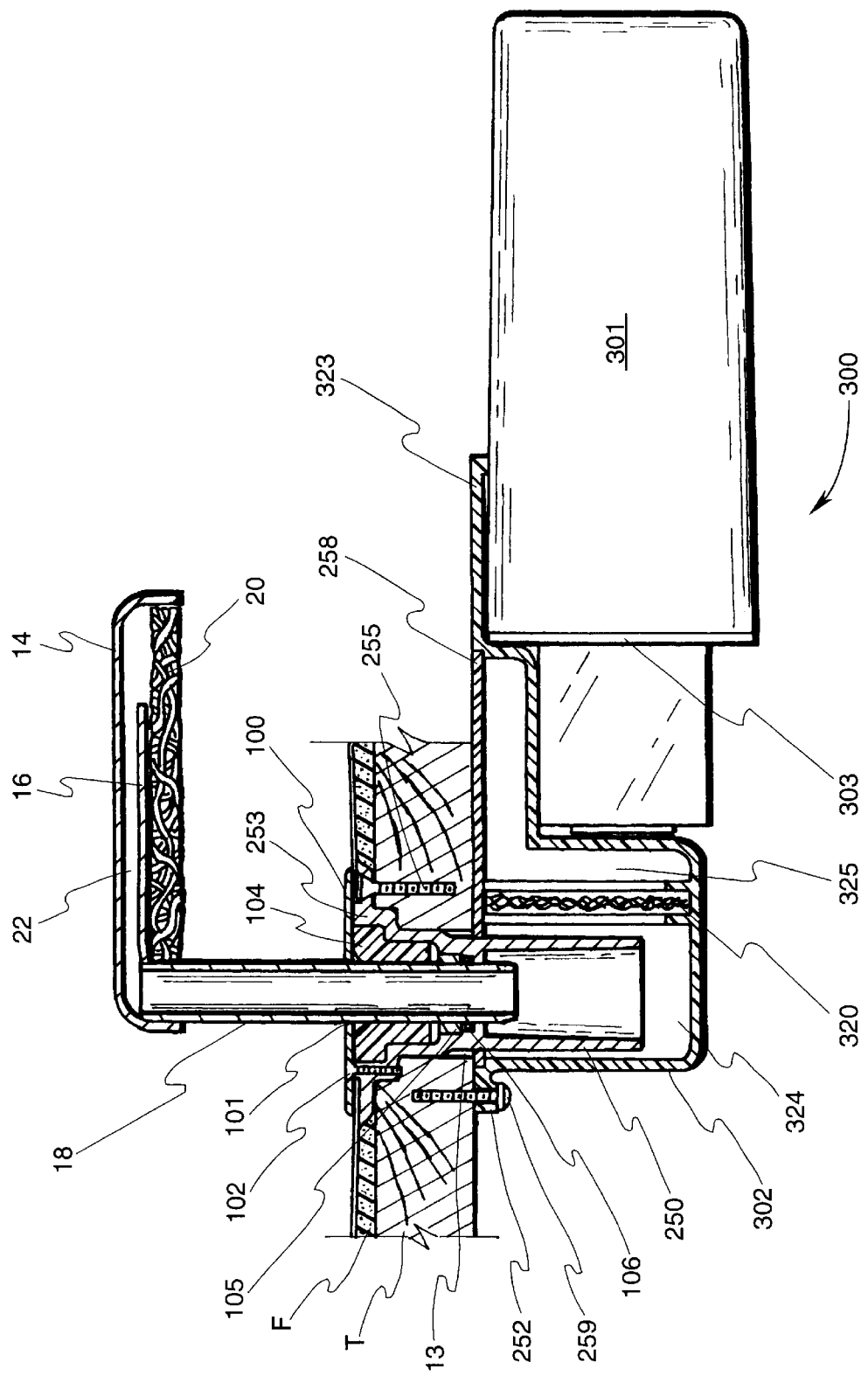
FIG. 7 is a further partially cut away cross-sectional view illustrating the combined hood and coaster, first stage filter, and manifold components of the system of the present invention, as installed on a conventional casino gaming table.
Figure 8:
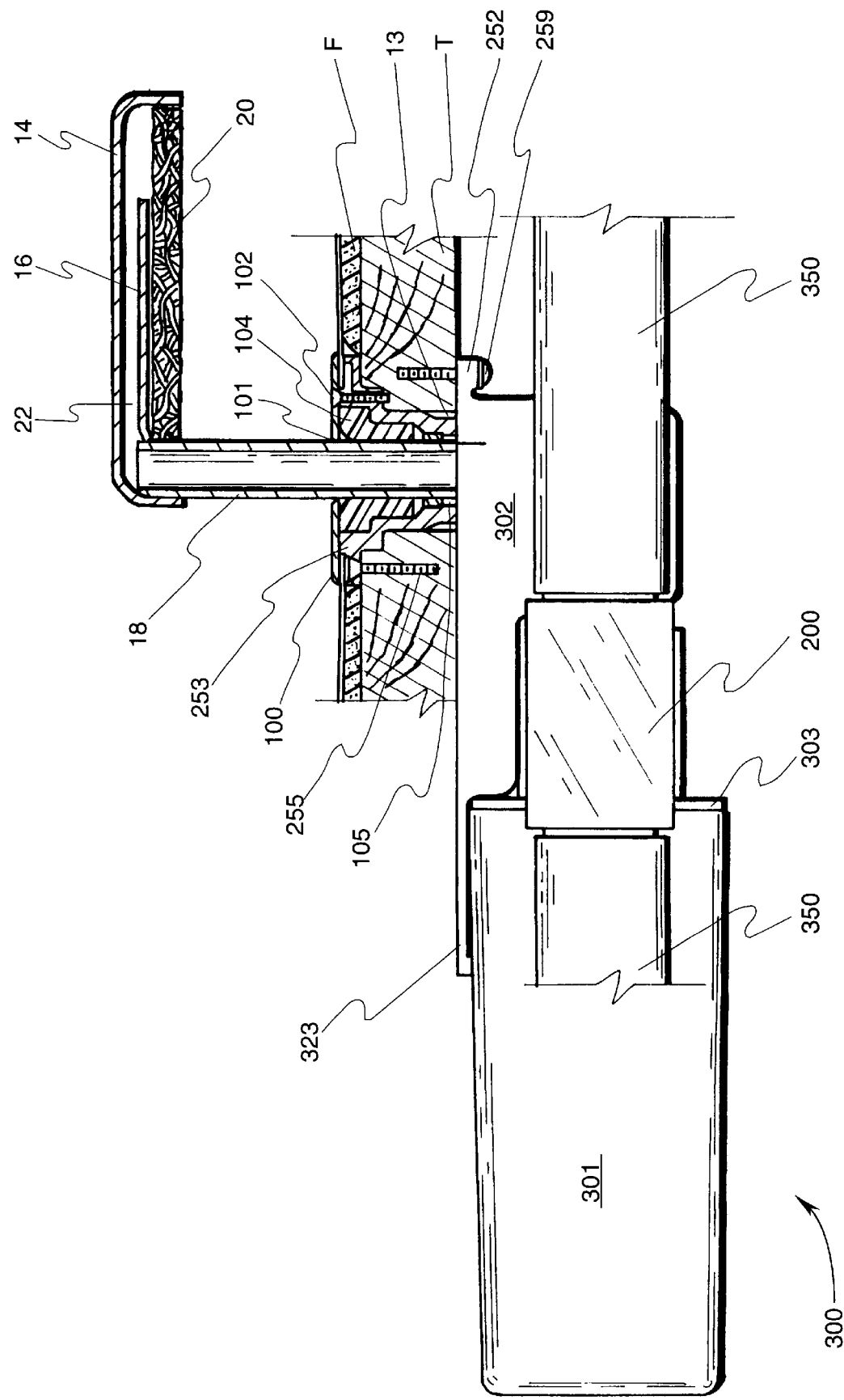
FIG. 8 is a still another partially cut away cross-sectional view illustrating the combined hood and coaster, first stage filter, and manifold components of the system of the present invention, as installed on a conventional casino gaming table.
Figure 9:
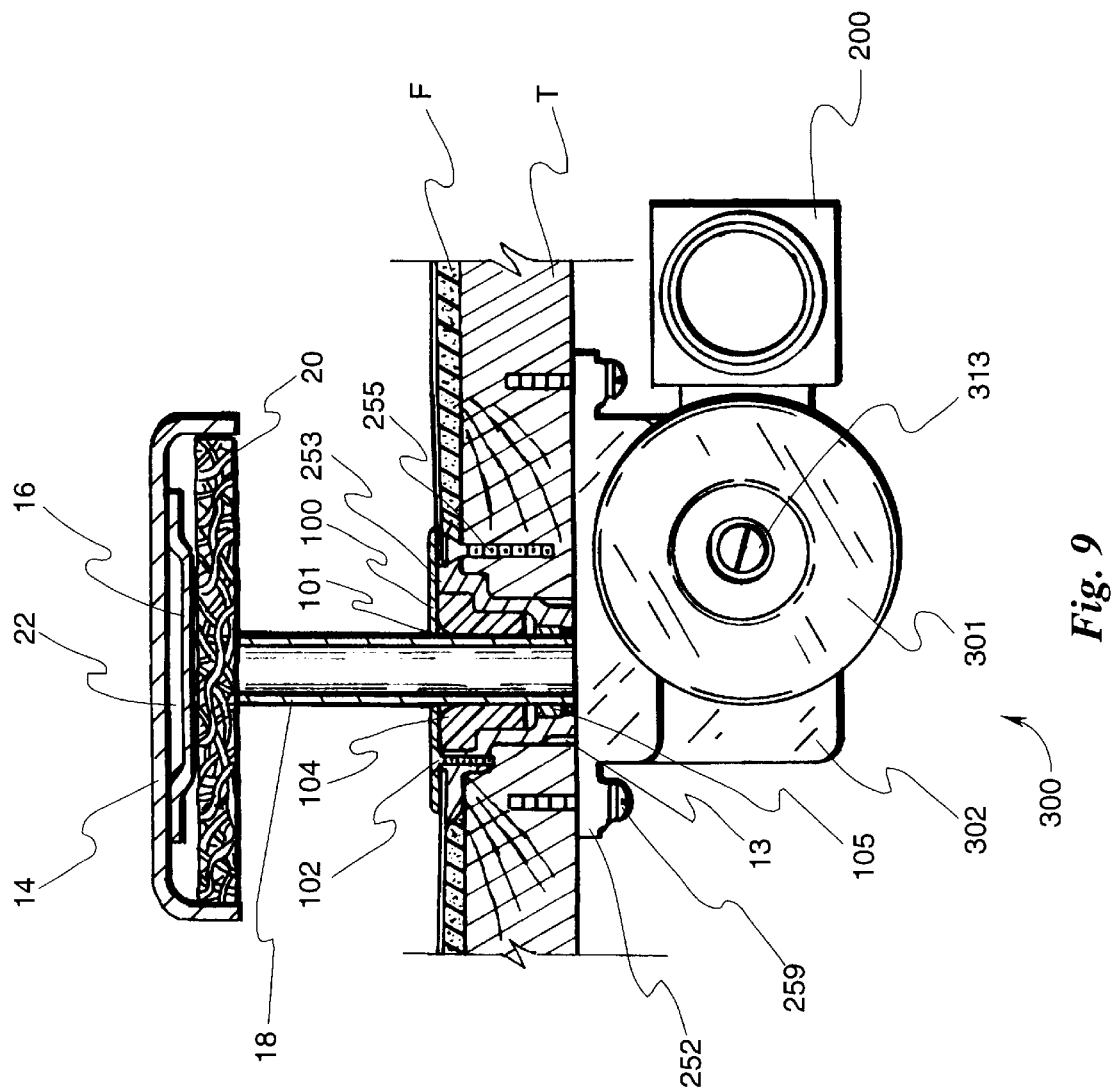
FIG. 9 is yet another partially cut away cross-sectional view illustrating the combined hood and coaster, first stage filter, and manifold components of the system of the present invention, as installed on a conventional casino gaming table.

As can be appreciated from FIGS. 6–11, a first stage filter element 300 includes a block-like body portion 302 having a projecting hollow cylindrical stub 318 extending outwardly from an end region of the block 302. A cover plate 258 has an aperture 257 which receives a barrel end portion 250 of the bushing 253. An expanded metal or other type pre-filter 320 retained by channel brackets 321 and 322 separates an expansion chamber 324 from an outlet chamber 325 of the block 302. The stub 318 is connected in fluid communication with the inlet leg 201 of the T connector 200. A hollow cylindrical replaceable filter cartridge 304 has an inner diameter dimensioned for press fit engagement over a flanged outlet opening 315 disposed in an end cap 303 of a filter canister 301. When assembled, a tie rod 307 having a slotted screw head end 313 and a threaded end 308 extending through the aperture 315, through the stub 318, and threadedly engaged in the block 302, extends centrally through the hollow interior of the filter cartridge 304. The end cap 303 covers the end of the cartridge 304 disposed adjacent the block 302, and the slotted screw head end 313 of the tie rod 307 extends through the flanged aperture 315 of the end cap 303, and through a coaxial aperture 312 disposed centrally in a distal end face of a hollow filter canister 301, thus sealing the cartridge 304 within the canister 301. A sealing lip or annular ledge 314 of the cap 303 engages the inner circumference of the open end portion of the canister 301. In use, air and entrained smoke flows through the expanded metal filter 20 in the hood 14, through a plenum portion 22 of the hood 14 formed by a baffle 16, downwardly through the flue member 18, through the end portion 250 of the bushing 253, into an expansion chamber 324 in the block 302, through a filter 320 in the block 302, into an outlet chamber 325 of the block 302, out of a cylindrical outlet conduit 319 disposed in an end region of the block 302, into the filter canister 301 through an aperture 316 in the end cap 303, and along an annular space 306 between the outer surface of the filter cartridge 304 and the inner surface of the canister 301, as shown in FIG. 6. The air and entrained smoke then pass through the cylindrical wall of the filter cartridge 304 and into its hollow interior. The filtered air then exits the filter cartridge 304 through the stub 318 and passes into the connector 200 through the leg 201. The filter cartridge 304 is preferably a type of filter media available from the Finite Filter Division of Hanafin Parker, under the designation FINITE GRADE 6, and comprises a borasilicate microglass filter medium with graded porosity to remove aerosols and larger contaminants from an airstream. Other conventional filter media may also be employed.

The filter element 300 serves to remove tars and other visible components of smoke from the airstream prior to passage into the manifold. The filter cartridges 304 may be easily replaced by removing the tie rod 307 and canister 301.

An elastomeric seal member 104 disposed in the bushing 253 has a conically tapering body portion with longitudinal slots such that leaf portions of the seal formed by the slots spring together upon withdrawal of the flue member 18, thus substantially preventing air flow through the bushing into the filter and manifold assembly. This allows removal of the hoods 14 when not in use, or for service, without affecting system performance through loss of vacuum. The bushing 253 also contains a secondary seal ring 105 and an O-ring seal 106.

With reference now again to FIGS. 1 and 6–11, the manner of connecting and securing a filter element 300 at an ashtray location will now be described in detail. A properly selected one of the connectors 110, 150, or 200 is employed at each ashtray location. In the case of end most ashtray locations in the manifold, L connectors 110 are utilized. At intermediate locations, T connectors 200 are used. In FIGS. 6–11, an intermediate ashtray location is illustrated in conjunction with a T connector 200. In order to ensure central alignment, the busing 253 is preferably first inserted through the hole 13 in the table T, and the end portion 250 of the bushing 253 engaged within the aperture 257 in the cover plate 258 of the block 302 prior to securement of the filter element 300 in position using screws 259 disposed through holes 254 in the mounting flange 252.

After completion of the above installation steps at each ashtray location, using the appropriate ones of the connectors 110, 150, and 200, the conduit segments 350 may be connected to the connectors by press fit engagement with or without an adhesive or by using an appropriate length of heat shrink tubing, or by other conventional fastening techniques.

With reference to FIGS. 12–22, the housing 400 contains a charcoal filter 380 which is a generally conventional item, employing powdered charcoal disposed in a canister between screen end plates. Filter charcoal of the grade known commercially as #612 coconut hull carbon is preferred. Preferably, the charcoal filter 380 comprises a disposable filter element replaceably disposed in the housing 400 and secured by an elastic spring or bungee cord 402. The vacuum motor/pump assembly 420 preferably comprises a brushless 12 VDC motor 423 and a rotary blower 422 capable of providing a 250 to 300 cubic feet per minute airflow through the system. The motor/pump assembly 420 and the filter 380 are preferably enclosed in an insulated housing 400 in order to dampen sound and vibration created by airflow through the system and by motor operation. More specifically, the motor 423 and the blower 422 are disposed in a first sound insulated housing assembly 420, which is in turn disposed in a second sound insulated housing 400. A preferred sound insulating material comprises a closed cell foam, which is illustrated as a lining 421 in the housing 420. A vibration dampening gasket 424 provides a shock mounting for the motor 423 and the blower 422.

In the illustrated preferred configuration, the housing 400 includes a floor plate 401 having at one end a transverse end wall 403. A rubber gasket or similar shock mounting member 404 disposed between the motor/pump assembly 420 serves to dampen vibration and quiet the unit. The shock mounting member 404 and the motor/pump assembly 420 are preferably secured to the end wall 403 by conventional fasteners such as screws or bolts. A rubber gasket disposed between the housing 420 and the end wall 403 seals the interior of the housing 420, which is thus pressurized by the outlet of the blower 422 which exhausts into the housing 420. The pressurized air from the interior of the housing 420 passes through an outlet 383 into the charcoal filter 380, from which it is exhausted through an outlet aperture 416 into the interior of the unsealed housing 400. Thus, the inlet of the filter 380 is connected to the outlet 383 of the motor/pump assembly 420, such that the air flow path is into the motor/pump inlet 381, through the motor/pump assembly 420, through the filter 380, and out of the filter exhaust portal 416, and into the interior of the housing 400. A gasket 409 glued or otherwise secured to a peripheral flange 409 of the cover 406 substantially seals the housing 400 when its cover 406 is closed, except in regions 415 disposed adjacent pivot support flanges 405 which receive pins 407 which pivotally mount the cover 406 to the floor plate 401. The filtered air exhausted through the filter portal 416 distributes itself through the sound insulated interior of the housing 400 and escapes quietly to ambient through the unsealed regions 415. The housing 400 also includes a latch assembly including a latch member 413, which may take the form of a screw or other fastener, secured to a bracket 412 attached to a central edge portion of an end face of the cover 406. The latch member 413 engages a cooperating fasteners, such as a threaded socket 411, disposed centrally at one end of the floor plate 401. The floor plate 401 includes a plurality of holes 414 intended for use in securing the housing 400 to an intended mounting surface, such as the underside of a table, using conventional fasteners such as screws or bolts. As may now be readily appreciated, a technician may easily access the motor/pump assembly 420 and filter 380 for service or replacement by simply pivoting the cover 406 to the open position shown in FIG. 30.

It should be noted that the particular construction of the sound insulated double housing described above is just one example embodiment, and that alternative constructions may be employed within the present invention. One important aspect of the present invention is the provision of a first substantially sealed and pressurized sound insulated motor and pump housing disposed within a second sound insulated housing, in conjunction with the use of vibration dampened mounting of the blower and motor. Applicants have found that these features provide an exceptionally quiet smoke removal system which does not annoy or distract users.

A conventional 120 VAC input and 12VDC output power supply 480 provides 12 VDC power to the motor in a conventional manner. To provide simple on/off control and power on indication, a control box 500 is connected between the power supply 480 and the motor 420 using a quick connect wiring harness 490.

A manual flow meter testing technique may be employed to monitor filter condition. For example, by using a suitable adaptor, a flow meter can be connected in a one at a time sequential manner to each of the bushings 253 in order to individually determine the flow rate through each of the bushings. In this manner, the need to change one or more of the filter cartridges 304 of the first stage filter elements 300 may be readily and economically determined.

The present system thus provides an easily installed and maintained system to capture and remove smoke from ashtrays, using an entirely fireproof two-step filter system. The second stage charcoal filter unit 380 functions to remove smoking odors, and has a relatively long service life due to the pre-filtering operation of the first stage filter cartridges 304.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A system for removing smoke in the vicinity of ashtrays, comprising:

at least one hood adapted to at least partially overlie an ashtray;

an elongated tubular flue member connected to said hood and mounted for axis sliding movement to allow selective adjustment of the position of said hood; and a vacuum manifold connecting said flue member to a filter and a vacuum source for suctioning smoke from the vicinity of the ashtray.

2. The system of claim 1, wherein said hood includes an arcuate shroud adapted to at least partially surround an ashtray to facilitate containment and removal of smoke.

3. The system of claim 1, further comprising a filter element in fluid communication with said flue member for filtering air and smoke prior to passage into said vacuum manifold.

4. The system of claim 3, wherein said filter element includes an elongated hollow cylindrical replaceable filter cartridge having a central hollow interior portion in fluid communication with said vacuum manifold, said filter element disposed in a substantially air tight canister assembly in fluid communication with said hood, such that air and smoke from said hood are filtered through said filter cartridge prior to passage into said manifold.

5. The system of claim 4, wherein said filter element includes an elongated axially extending tie rod for securing an end cap to said filter cartridge.

6. The system of claim 1, wherein said vacuum manifold comprises flexible tubing.

7. The system of claim 1, wherein said system includes a plurality of hoods, with a first stage filter associated with each of said hoods for filtering out smoke from a plurality of ashtrays prior to passage into said vacuum manifold.

8. The system of claim 1, wherein said tubular flue member is slidably received in substantially air tight engagement within a bushing to allow vertical adjustment of the position of said hood.

9. The system of claim 8, wherein said bushing mounts said hood for movement to a lowered position substantially flush with a mounting surface such that a top surface of said hood forms a drink coaster.

10. The system of claim 8, wherein said bushing includes at least one seal member to substantially seal passage of air through said bushing upon complete removal of said flue member from said bushing.

11. The system of claim 1 wherein said hood comprises a substantially circular disk shaped member.

12. The system of claim 1, wherein said hood comprises a plenum for the passage of smoke and a filter for preventing the induction of large combustible materials into said plenum.

13. The system of claim 1, further comprising a first stage filter element in fluid communication with said flue member for filtering smoke prior to entry into said manifold, said first stage filter element including a mounting block portion having an expansion chamber to reduce velocity of air and smoke passing through said flue member.

14. The system of claim 1, further comprising a first stage filter element in fluid communication with said flue member for filtering smoke prior to entry into said manifold, said first stage filter element including a mounting block portion having a chamber adjustably receiving said flue member to permit adjustment of the position of said hood.

15. The system of claim 14, further comprising a bushing at least partially disposed in said chamber mounting said flue member for sliding adjustable movement.

16. The system of claim 15, further comprising at least one seal disposed in said bushing to substantially prevent air flow through said bushing upon complete removal of said flue member from engagement with said bushing.

17. A system for removing smoke from the vicinity of ashtrays, comprising:

a support surface;

at least one hood;

a hole formed through said support surface;

a bushing disposed in said hole and extending at least partially through said support surface;

a tubular flue member disposed in fluid communication with and connected to said hood, paid flue member received for sliding vertical adjustment in said bushing, whereby a user may selectively vertically adjust the position of said hood above said support surface;

a filter in fluid communication with said flue member; and a vacuum source in fluid communication with said filter.

18. The system of claim 17, further comprising at least one seal in said bushing for substantially preventing flow of air through said bushing upon removal of said flue member from engagement with said bushing.

19. A system for removing smoke from the vicinity of ashtrays, comprising:

a plurality of hoods;

means mounting said hoods for selective axial sliding adjustment;

mean creating a passage through each of said hoods for the passage of smoke;

means for preventing ashes and other debris from entering said passage;

means connecting each of said hoods in a common manifold;

means for creating a vacuum in said common manifold; and means for filtering smoke from air passing through said manifold.

* * * * *